US008029589B2

(12) United States Patent  (10) Patent No.: US 8,029,589 B2
Driesen et al.  (45) Date of Patent: Oct. 4, 2011

(54) LASER WELDING METHOD AND FILTER ELEMENT PRODUCED BY IT

(75) Inventors: Eckart Driesen, Heidelberg (DE); Ulrich Schloer, Darmstadt (DE)

(73) Assignee: Carl Freudenberg KG, Weinheim (DE)

( * ) Notice: Subject to any disclaimer, the term of this patent is extended or adjusted under 35 U.S.C. 154(b) by 342 days.

(21) Appl. No.: 12/093,326

(22) PCT Filed: Nov. 7, 2006

(86) PCT No.: PCT/EP2006/010640
§ 371 (c)(1), (2), (4) Date: Jul. 1, 2008

(87) PCT Pub. No.: WO2007/054262
PCT Pub. Date: May 18, 2007

(65) Prior Publication Data
US 2008/0276584 A1  Nov. 13, 2008

(30) Foreign Application Priority Data

Nov. 11, 2005 (DE) .......................... 10 2005 054 272

(51) Int. Cl.
*B29C 46/00* (2006.01)
(52) U.S. Cl. .......... 55/497; 55/502; 55/521; 55/DIG. 5; 55/DIG. 31; 264/145; 264/310; 264/322; 264/DIG. 48
(58) Field of Classification Search .................... 55/490, 55/497, 498, 502, 507, 509, 521, 527, DIG. 5, 55/DIG. 31; 250/251, 281; 976/DIG. 427; 264/145, 310, 322, DIG. 48
See application file for complete search history.

(56) References Cited

U.S. PATENT DOCUMENTS

| 3,710,279 | A | * | 1/1973 | Ashkin .......................... 250/281 |
| 5,089,202 | A | * | 2/1992 | Lippold ......................... 264/145 |
| 5,902,361 | A | * | 5/1999 | Pomplun et al. ............. 55/385.3 |
| 6,045,598 | A | * | 4/2000 | Fath et al. ...................... 55/490 |
| 6,162,272 | A | * | 12/2000 | Michaelis et al. .............. 55/497 |
| 6,267,796 | B1 | * | 7/2001 | Schottmer ....................... 55/502 |
| 6,416,570 | B2 | * | 7/2002 | Goto et al. ...................... 96/134 |

(Continued)

FOREIGN PATENT DOCUMENTS
DE  10058251  8/2001
(Continued)

OTHER PUBLICATIONS

International Preliminary Examination Report received in related International Patent Application No. PCT/EP2006/010640 dated May 22, 2008.

(Continued)

*Primary Examiner* — Duane Smith
*Assistant Examiner* — Minh-Chau Pham
(74) *Attorney, Agent, or Firm* — Grossman, Tucker, Perreault & Pfleger, PLLC

(57) ABSTRACT

A method is provided for connecting a filter medium to a connection element, wherein the filter medium and the connection element are brought into contact with each other and connected to each other by exposure to laser radiation. The connection element may be welded to the end faces of filter folds in strips having a width of 1 mm. The connection element may include a laser light-absorbing layer and a laser light-transparent layer. The filter medium and connection elements may comprise nonwoven fabrics.

19 Claims, 6 Drawing Sheets

U.S. PATENT DOCUMENTS

| | | | |
|---|---|---|---|
| 6,454,826 B2 * | 9/2002 | Fath et al. | 55/490 |
| 7,070,641 B1 * | 7/2006 | Gunderson et al. | 55/497 |
| 7,261,757 B2 * | 8/2007 | Duffy | 55/502 |
| 7,608,137 B2 * | 10/2009 | Oda | 96/134 |
| 2001/0032545 A1 * | 10/2001 | Goto et al. | 96/134 |
| 2003/0070405 A1 * | 4/2003 | Michaelis et al. | 55/497 |
| 2003/0070406 A1 * | 4/2003 | Duffy | 55/497 |
| 2003/0196750 A1 | 10/2003 | Sakai | |
| 2006/0219624 A1 | 10/2006 | Kuno | |
| 2007/0193237 A1 * | 8/2007 | Beigel et al. | 55/505 |
| 2009/0044503 A1 * | 2/2009 | Ammersdoerfer | 55/497 |
| 2009/0241497 A1 * | 10/2009 | Imai et al. | 55/524 |
| 2010/0251680 A1 * | 10/2010 | Suzuki et al. | 55/483 |

FOREIGN PATENT DOCUMENTS

| | | |
|---|---|---|
| DE | 10211782 | 9/2003 |
| DE | 10317971 | 11/2003 |
| EP | 1438998 | 7/2004 |
| EP | 1710007 | 10/2006 |
| WO | 2006050763 | 5/2006 |

OTHER PUBLICATIONS

International Search Report received in related International Patent Application No. PCT/EP2006/010640 dated Jan. 31, 2007.

* cited by examiner

LASER WELDING METHOD AND FILTER ELEMENT PRODUCED BY IT

TECHNICAL FIELD

The invention relates to a method for joining a filter medium to a connection element, and further relates to a filter element.

PRIOR ART

Methods are known from the prior art which use the ultrasonic welding technique for joining filter media to elements. In the ultrasonic welding technique, defined regions of a material are fused and integrally joined to another material. This is achieved by bringing ultrasonic sonotrodes into contact with a material layer to be fused. A disadvantage is that the sonotrodes impinge the melt regions with a relatively high force over a large surface area. As a result, the material around the actual contact points acquires relatively large indentations, compressed areas, thickened regions, and other deformations.

Material deformations result in impairment of the filtering effect, thereby significantly limiting the effectiveness and the efficiency of filter systems. In addition, the use of adhesive as a joining means is disadvantageous, since its processing is very laborious.

DESCRIPTION OF THE INVENTION

The object of the invention, therefore, is to provide filter systems which ensure optimal filtering performance while being simple to produce.

Accordingly, a method is provided for joining a filter medium to a connection element, wherein the filter medium and the connection element are brought into contact with one another and at the same time are joined together by exposure to laser radiation.

According to the invention, it has been found that exposure to laser light changes the structure only of material regions which are intended to function as contact points. The use of laser light allows not only particularly rapid heating of materials, but also particularly precise production of filter systems without damage to the materials. As the result of being able to selectively direct a laser beam onto a contact point, surrounding material regions are impinged on with comparatively less force and with little or no deformation, in complete contrast to the ultrasonic welding process. This prevents impairment of the filtering performance of material regions which are not intended to have a joining function. It has also been found that the joining partners may be brought into contact and, in a mutually adjacent configuration, joined together in one work step.

In the joining technique according to the invention, only the regions of the filter medium and of the connection element facing the contact point are fused or melted in order to integrally join the joining partners. It is advantageous that the regions of the filter medium exhibit no compressed or thickened zones near the contact points, since it is not necessary to press the connection element with great force during the welding process. In complete contrast to the method according to the invention, in the ultrasonic welding technique the joining partners are welded under severe mechanical stress. This typically results in compressed and thickened regions on at least one joining partner. The method according to the invention also omits adhesives, so that the contact points at which the joining partners adjoin one another are free of adhesive. Adhesive residues may impair the filtering performance.

The above-described disadvantages which restrict the filtering performance are avoided in the method according to the invention. As a result, a filter system may be achieved which ensures optimum filtering performance while being simple to produce. The object referenced above is achieved in this manner.

A folded flat sheet may be used as filter medium in a particularly advantageous manner. This allows the effective filter surface to be increased. On this basis it is also possible to provide a filter medium in the form of a flat filter or star filter. Flat filters are used primarily in air filtration, in particular in the automotive sector. Activated carbon may be associated with the flat filter for improvement of air quality. Star filters are frequently used for liquid filtration, in particular in the filtering of oils.

At least one connection element may be joined to the folded pleats of the flat sheet. This particular design ensures that the distance between the folded pleats is held constant. This is necessary in particular when the filter medium is subjected to high flow rates. In the worst-case scenario individual folds may become stuck together, thereby reducing the effective filter surface and adversely affecting the filtering effect.

At least one connection element may be joined to the folded end faces of the flat sheet. The folded end faces may be joined to a strip-shaped connection element to maintain the folds at a defined distance from one another. A connection element which is joined to the folded end faces may also function as a frame structure, thereby imparting increased flexural strength and stability to the filter element. This is particularly advantageous when the filter element is installed. The frame structure may also have a sealing effect with respect to the walls of the filter housing.

The connection element may be designed as an end cap for a star filter, and may be made of the same material as the filter medium. This design allows a homogeneous structure of a filter element and problem-free integral joining of the connection element to the filter medium, thereby achieving optimal leak-tightness.

The connection element may be designed as a V-shaped flap or a strip-shaped element which extends along one side of a flat filter. In this manner a sealing effect may be achieved, namely, when the V-shaped flap functions as a sealing agent and is attachable to a filter housing.

During the laser welding process the connection element and the filter medium may be gently pressed together in such a way that neither the connection element nor the filter medium is permanently deformed. This method step facilitates inflow of the melt of one of the two partners to be joined into the material of the other partner. It is possible to fuse only one of the partners to be joined, so that the melt flows, at least in places, into the material of the unfused partner. On this basis the filter medium may be made of a nonwoven fabric, a mesh, wires, or films. These particular designs ensure sufficient porosity of the filter medium in order to accommodate the fused material of the connection element and to achieve a stable integral connection. At the same time, use of a mesh or a wire mesh has the advantageous effect of stabilizing the overall structure of a filter element comprising a filter medium and a connection element.

A thermoplastic nonwoven fabric may be used as filter medium. Use of a thermoplastic nonwoven fabric allows fusion of the filter medium, thus producing a composite with the connection element. On this basis, not only the filter medium but also the connection element may be designed as a thermoplastic nonwoven fabric. In this particular case the two partners to be melted may be fused in such a way that the melts are intermixed in the molten state at the contact points. In this manner a particularly strong composite is obtained.

Activated carbon may be admixed with at least the filter medium for the absorption of odors. The activated carbon may be homogeneously distributed within the filter medium. On this basis, activated carbon may also be distributed in the connection elements.

By use of laser radiation, defined regions of the filter medium and/or of the connection element which face away from the laser radiation source may be fused. Such regions may be contained inside a material that is at least partially transparent to laser light, or may be covered by such a material. The fusion of defined regions allows the selective formation of contact points, which may be distributed over the entire surface of the filter medium or connection element.

The extent of a fused region, namely, a contact point, may be 1 millimeter maximum, preferably 0.1 millimeter, in at least one spatial direction. These dimensions result in particularly low impairment of the filter medium with regard to the filter properties resulting from fused regions. In addition, fused regions having dimensions in the range of 0.1 mm surprisingly impart the composite of two melted partners with sufficient tensile strength to prevent separation of the partners from one another.

It is very particularly preferred for a fused region to have a depth of 0.1 to 1 mm. The term "depth" is understood to mean the extent of the region in the joining direction of the filter medium and the connection element, i.e., orthogonal to the mutually adjacent surfaces of the joining partners. In this manner the elasticity of the connection element and of the filter medium is only very slightly affected by fused and recooled material.

A diode laser having a wavelength of 980 nm and a power of 90 W has proven to be particularly advantageous in fusing thermoplastic nonwoven fabrics. A planar connection of two joining partners may be achieved by using a laser beam source which produces a strip-shaped light spot on the connection element or filter medium. The strip may have a width of 1 mm and a length of 30 mm. By use of this light source a contact point may be produced that is 1 mm wide, 30 mm long, and 0.1 to 1 mm deep.

The contact points may have a punctiform, linear, or planar design. A linear connection ensures greater rigidity and lower mobility of the filter medium relative to the connection element. Providing welding points allows slight mobility of the filter medium with respect to the connection element. This may be particularly advantageous when the objective is to minimize impairment of the filter properties as the result of fixing structures. A particularly strong and rigid connection may be achieved by providing contact points having a planar shape.

The energy of the laser radiation may be transmitted to the regions or contact points by an optical device. This particular embodiment of the method allows the use of lenses and/or mirrors to deflect or split laser beams. In this manner two contact points, for example, may be produced at the same time using a single laser beam, namely, when a laser beam is split into two beams.

The optical device may be brought into contact with the filter medium and/or the connection element. This method step ensures particularly good occupational safety by avoiding the scattering of laser light in a room in which workers are present.

On this basis, at least one sphere that is transparent to laser light may be used as the optical device. The sphere may be provided in the form of a glass sphere. Use of a sphere allows essentially frictionless sliding on the material to be fused. As a result of the sphere sliding in an essentially frictionless manner over the material to be fused, the material to be fused is not impaired by pressure marks and thus by undesired material deformations. The pressure load from the sphere may be precisely selected so that a melt of one joining partner enters into the other.

On this basis, at least one rotatable disk or a cylinder which is transparent to laser light may be used as the optical device, by means of which the laser beam may be passed through in the radial and/or diametrical direction. Use of one or more such disks or cylinders allows a particularly efficient production process for flat filters with a bellows having strip-shaped connection elements. The connection element may be welded on by use of rotating disks or cylinders which are rolled on the sides of the bellows while supplying and pressing the connection element. The laser light may be guided in such a way that it orthogonally strikes a connection element guided tangentially between the disk or cylinder and the bellows.

A connection element may be used which has a multilayer design. At least one layer may be transparent to laser light, and another layer may absorb laser light. This particular design allows the use of a particularly stable connection element composed of a stable layer that is transparent to laser light and a layer which absorbs laser light, and which tends to melt or heat up when impinged on by laser light. In this regard the laser light-absorbing layer may establish a connection with the filter medium. The composite comprising the connection element and the filter medium may be produced either by melting the laser light-absorbing layer or by heating same. Heating the laser light-absorbing layer causes the connection element and the filter element to melt, allowing them to flow into one another in the melted regions.

On this basis, the laser light-absorbing layer and the laser light-transparent layer may be produced by coextrusion. This allows particularly economical production.

It is also possible to apply the laser light-absorbing layer by impregnation or printing on the stable laser light-transparent layer. Use of an impregnation or impregnation printing process allows a particularly thin laser light-absorbing layer to be achieved.

On this basis, a light-transparent layer may contain pigmentation which is present either on the surface of the layer or homogeneously distributed therein. The pigmentation brings about absorption of the laser light, and then results in melting of the material of the layer. The pigments may be introduced into the layer in an extrusion process.

The laser light-absorbing layer may also be associated with the filter medium. In particular, said layer may be firmly attached to the filter medium or may be a part of same. This particular design allows a connection element that is completely transparent to laser light to be attached to the filter medium. In addition, the laser welding process is simplified when the laser light-absorbing layer is permanently assigned to the filter medium or is a part of same.

The laser light-absorbing layer may be imprinted on the filter medium, or may be present as a coating on same. Printings and coatings may be applied in a particularly rapid manner. The folded end faces of a folded filter medium may preferably be imprinted or coated in order to easily accommodate a connection element.

On this basis, the filter medium may also include activated carbon, with the activated carbon particles functioning as laser light-absorbing centers. The odor-absorbing effect of the activated carbon is advantageously combined with the capability of the activated carbon to absorb laser light. The absorption of laser light generates heat, which melts regions of the filter medium and/or of the connection element. When the filter medium is designed as a bellows, the activated carbon particles may be deposited on the folded end faces, thus allowing attachment of a connection element.

The light-transparent layer may be used as a guide or support for the other layer, namely, the laser light-absorbing layer. The two layers may be separately supplied to the filter medium. The light-transparent layer may be placed in a cycle for reuse, whereby the laser light-absorbing layer remains adherent to the filter medium after separation from the light-transparent layer. This allows the laser light-absorbing layer to be provided in a precise and cost-effective manner.

Accordingly, a filter element comprises at least one filter medium and at least one connection element associated with the filter medium, and the filter medium and the connection element are joined together via contact points which include a melt region produced by laser radiation.

In the filter element according to the invention, in order to produce an integral connection of the joining partners only the regions of the filter medium and of the connection element facing the contact point are fused or melted.

In order to avoid repetitions with regard to the inventive step, reference is made to the discussion of the method as such. The connection element may completely cover the surface of at least one side of the filter medium. This design allows the connection element to be used as a prefilter.

The contact points at which the joining partners of the filter element according to the invention are mutually adjacent may be free of adhesive. Adhesive residues may impair the filtering performance.

It is advantageous for the regions of the filter medium to exhibit no compressed or thickened zones near the contact points, since the connection element has been pressed on with very little force during the laser welding process. In the ultrasonic welding process, in complete contrast to the method according to the invention one joining partner is pressed against the other under high pressure. This typically results in compressed or thickened regions in at least one joining partner which adversely affect the filtering performance.

All statements made regarding particularly advantageous embodiments of the method as such also apply to all advantageous embodiments of the filter element according to the claims which refer to the filter element.

There are various possibilities for advantageously providing and refining the teaching of the present invention. Reference is made to the following description of preferred exemplary embodiments of the invention, with reference to the drawings.

In conjunction with the explanation of the preferred exemplary embodiments of the invention with reference to the drawings, preferred designs and refinements of the teaching are also discussed in general.

IMPLEMENTATION OF THE INVENTION

Figure 1:
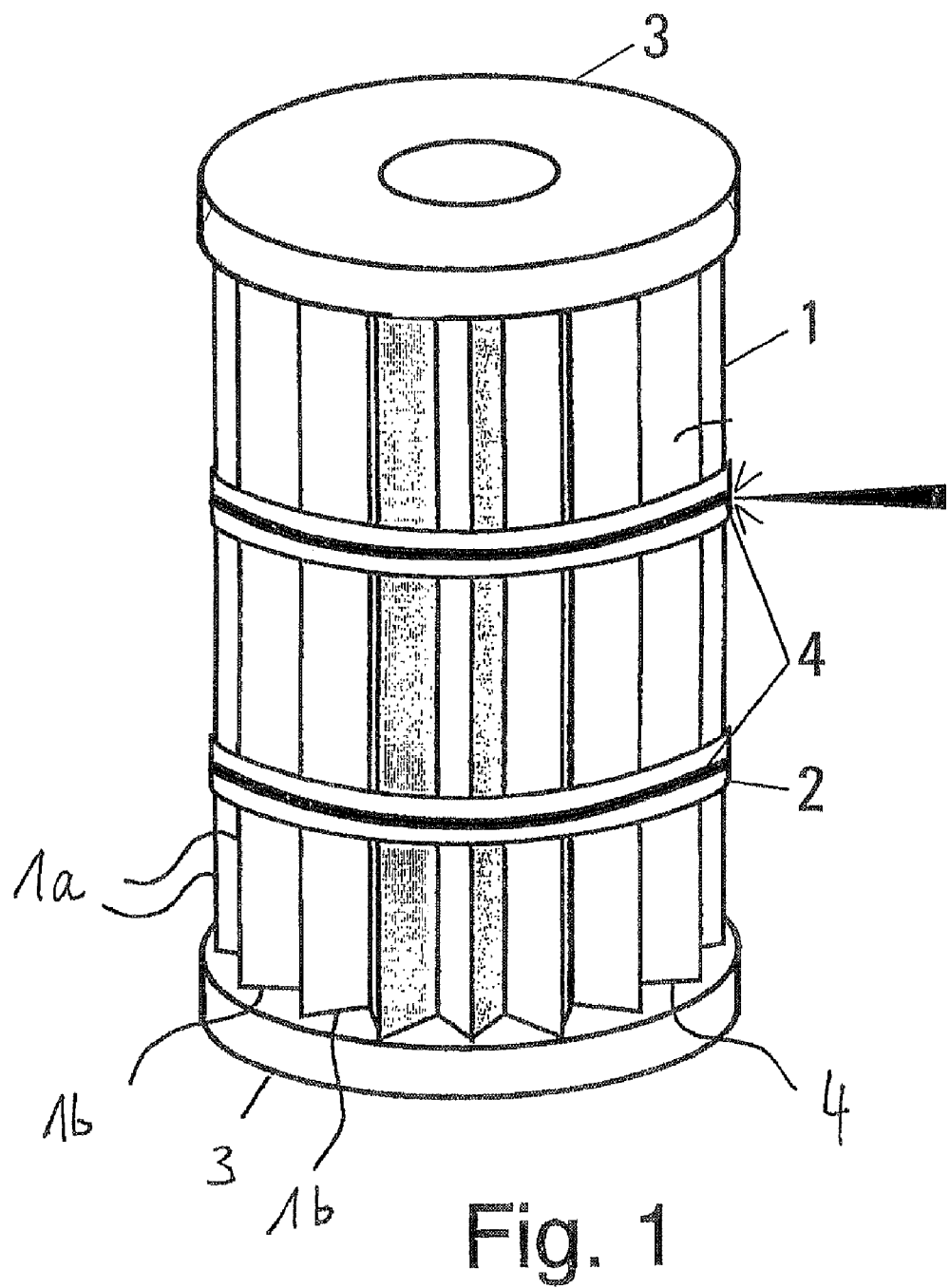
FIG. 1 shows a star-shaped filter element having a strip-shaped connection element.

FIG. 1 shows a filter medium for a star filter which is joined to a connection element 2. The connection element 2 is joined to the filter medium 1 by exposure to laser radiation. The filter medium 1 is designed as a folded flat sheet. The connection element 2 is joined to the folded pleats 1a of the flat sheet 1. The connection element 2 has a strip-shaped design. A further connection element 3 is joined to the fold end faces 1b of the flat sheet 1, and is provided as a cap 3.

The filter medium 1 and the connection element 2 are joined to one another via contact points 4 having a maximum width of 1 mm. The folded pleats 1a and the fold end faces 1b have no compressed or thickened areas at the contact points 4. The contact points 4 are also free of adhesive.

Figure 2:
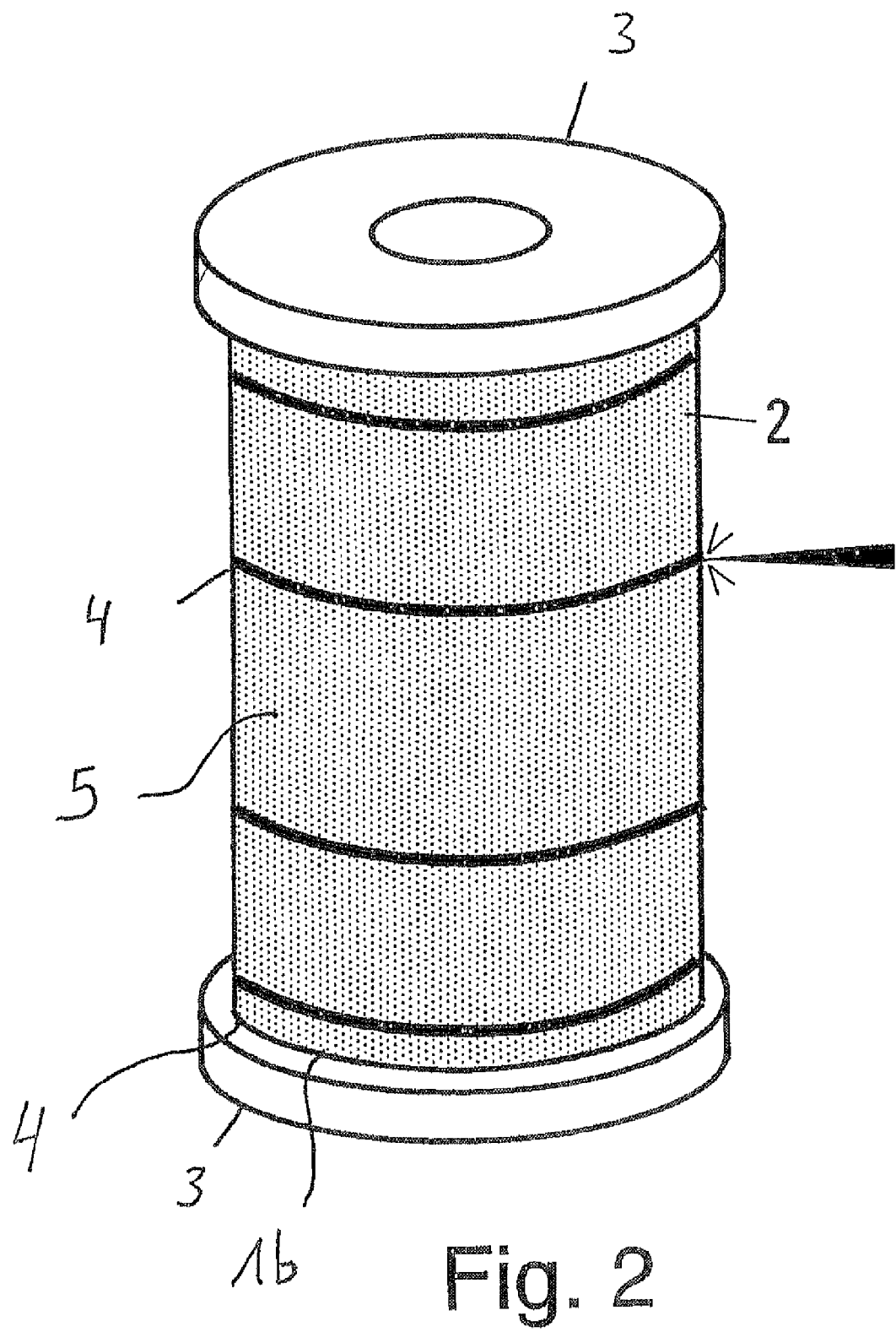
FIG. 2 shows a star-shaped filter element which includes a full-surface casing as connection element.

FIG. 2 shows a filter element according to FIG. 1 in which the connection element 2 is designed as a full-surface casing 5. The full-surface casing 5 acts as a prefilter for the filter medium 1. The contact points 4 have a circumferential design with a maximum width of 1 mm. The casing 5 is welded onto the folded pleats 1a of the filter medium 1 by exposure to laser radiation. Neither the folded pleats 1a nor the casing 5 have compressed or thickened areas at the contact points 4. The contact points 4 are free of adhesive. In addition, caps 3 are associated with the filter element which are likewise fixed in place on the filter medium 1, namely, at the fold end faces 1b, by laser welding. Here as well, there are no compressed or thickened areas having adhesive.

The caps 3, the connection elements 2, and the filter medium 1 may be composed of the same material.

Figure 3:
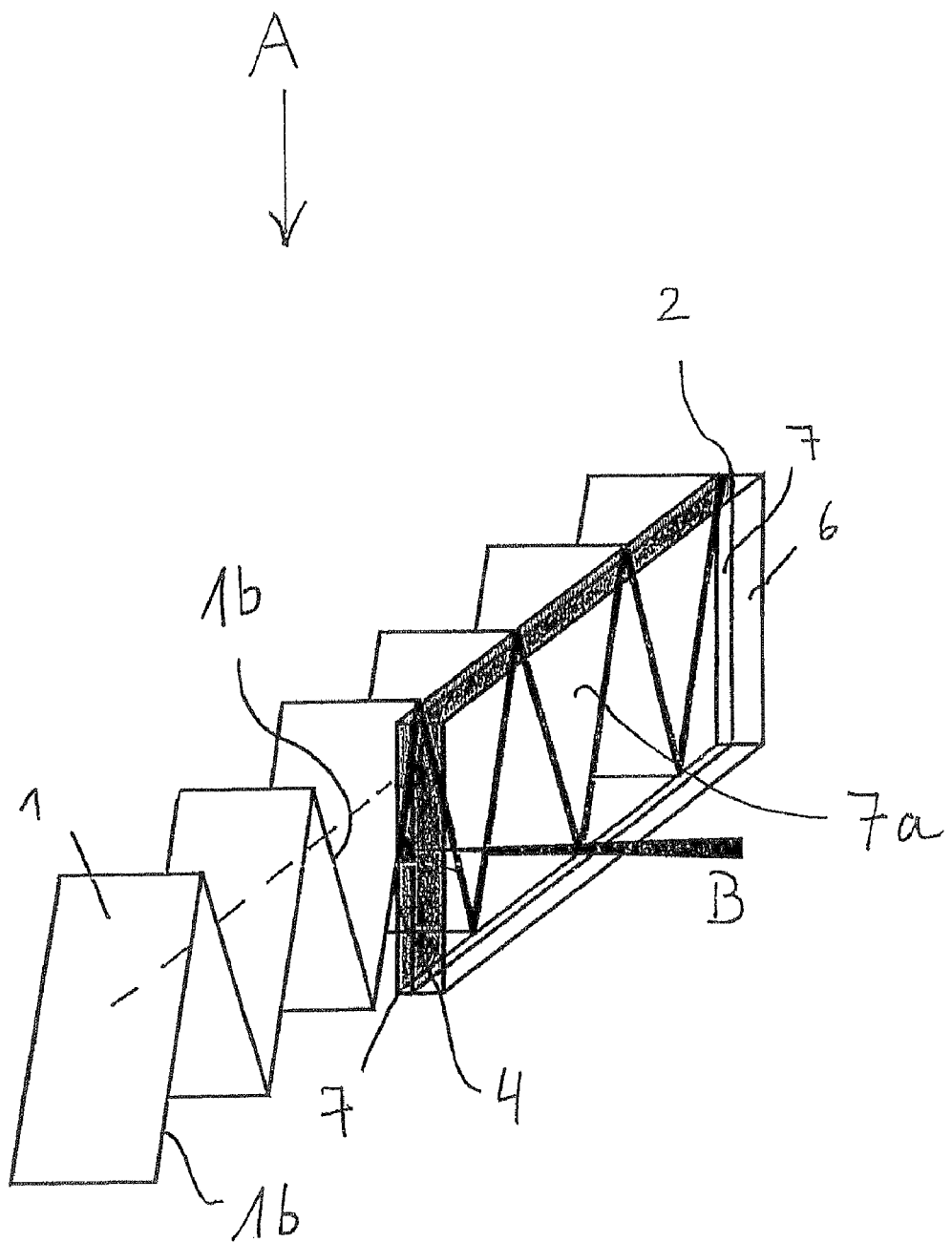
FIG. 3 shows a folded flat sheet brought into contact with a laser light-transparent layer which guides a layer against the filter medium.

FIG. 3 shows a folded flat sheet 1 of a filter medium 1 with which a connection element 2 is associated. This connection element 2 may have a single- or a double-layer design.

According to a first alternative, a laser light-transparent layer 6 presses a laser light-absorbing layer 7, essentially without exertion of force, against the fold end faces 1b of the sheet 1. The layer 7 is fused and joined to the sheet 1 by laser radiation (arrow B).

According to a second alternative, the layer 7 may be designed as a printed region, as a coating, or as pigmentation for the layer 6, which the laser light absorbs. In this manner the layer 6 and the filter medium 1 are melted and joined to one another at the contact points 4.

Furthermore, a coating, pigmentation, imprinting, or a similar layer or laser light-absorbing region may be associated with the fold end faces 1b of the folded sheet 1 in order to weld the laser light-transparent layer 6 to the filter medium 1.

The laser light source faces away from the laser light-absorbing layer 7 or the laser light-absorbing region. The layer 7 or the region is situated inside the system comprising the connection element and filter medium 1, so that the resulting contact points 4 as well are situated within the filter element, facing away from the laser light source.

The laser radiation source used produces a strip-shaped light spot on the connection element 2 or the filter medium 1 having a width of 1 mm and a length of 30 mm. In this manner, essentially full-surface welding of the connection element 2 to the fold end faces 1b may be achieved. No thickened or compressed regions of the fold end faces 1b occur at the contact points 4. The fused regions of the contact points 4 have a depth of 0.1 to 1 mm. In addition, only the fold end faces 1b are joined to the layers 6, 7. The contact points 4 as well as the triangular interspaces 7a of layer 7 and layer 6 are free of adhesive. As a result, the filter element is very flexible and easily drilled, and may also be used in filter housings having complex, curved shapes.

Figure 4:
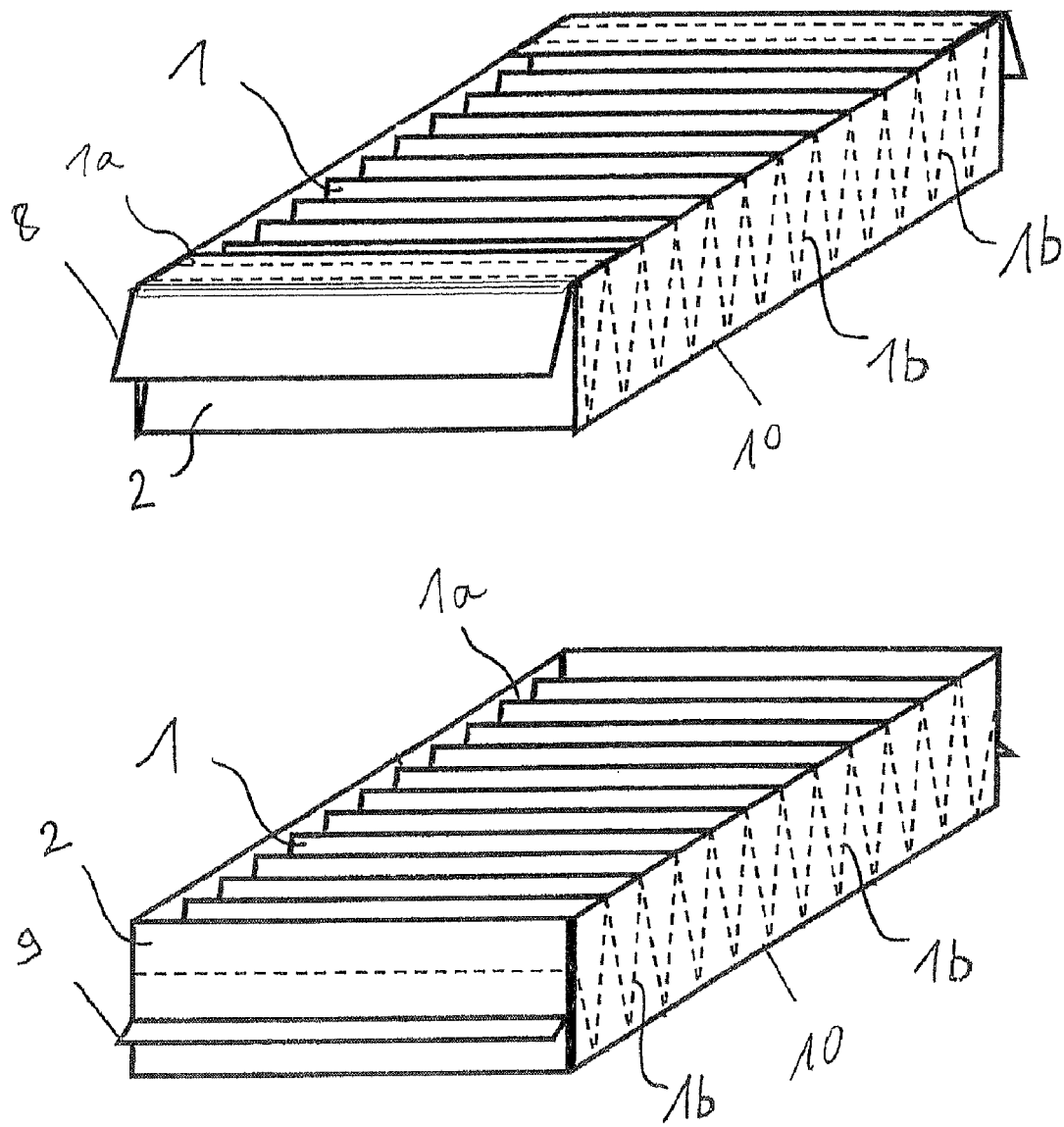
FIG. 4 shows two flat filters having V-shaped flaps.

FIG. 4 shows two flat filters produced in the same manner as described for FIG. 3. Strip-shaped connection elements 2 having V-shaped projecting legs 8 and 9 are associated with the flat filters along at least one side thereof. The connection elements 2 are joined to the flat sheet 1 by laser welding. The connection elements 2 for the upper flat filter in FIG. 4 are welded to the folded pleats 1a of the flat filter.

In one embodiment of the flat filter, the legs 8 are associated with the upper edges of the connection elements 2, and in another embodiment the legs 9 are associated with approximately the center of the connection elements 2. These legs 8, 9 are used to provide sealing contact in a filter housing which accommodates the flat filter. The strip-shaped connection elements 10 are joined to the fold end faces 1b of the sheet 1 by laser welding. For sealing contact of the flat filter, the V-shaped legs 8, 9 may also be associated with the strip-shaped connection elements 10, as previously described.

Figure 5:
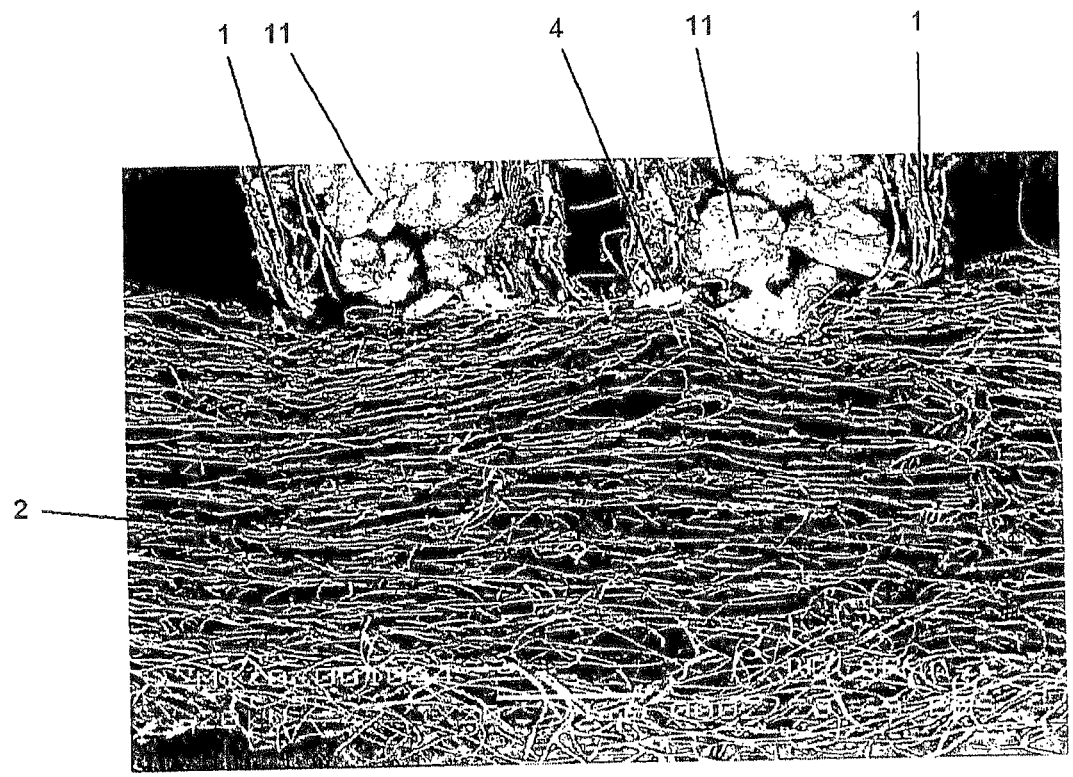
FIG. 5 shows a photograph, taken by a scanning electron microscope, of a connection element welded to a folded filter medium.

FIG. 5 shows a photograph, taken by a scanning electron microscope, of a filter element designed as a flat filter. The filter element has a folded sheet as filter medium 1, and analogously to FIG. 3 has a strip-shaped connection element 2. With reference to FIG. 3, FIG. 5 shows a top view of a filter element in the direction of arrow A, which has been sectioned along the dashed line shown in FIG. 3. The connection element 2, the same as the filter medium 1, is transparent to laser light and is made of a thermoplastic nonwoven fabric. A laser light-absorbing region containing activated carbon particles 11 is associated with the filter medium 1. It is particularly preferred that the activated carbon particles 11 are accessible to the laser light at the fold end faces. The activated carbon particles 11 absorb laser light which is irradiated in the direction of arrow B according to FIG. 3. The generated heat causes fusion of the fibers, from which the filter medium 1 and the connection element 2 are produced. Contact points 4 are produced at the melted regions.

Figure 6:
FIG. 6 shows a close-up view of the melted and recooled laser-welded contact point B identified in FIG. 5.

FIG. 6 shows the contact point 4 illustrated in FIG. 5 in a greatly magnified view. Contact point 4 is 400 μm long and 109 μm deep. The scale (100 μm) is illustrated as a line in the lower center portion of the photograph according to FIG. 6. The laser light or laser radiation source used for laser welding of the connection element 2 and the filter medium 1 is designed as a diode laser having a power of 90 W. The laser light or laser radiation has a wavelength of 980 nm.

With regard to further advantageous embodiments and refinements of the teaching according to the invention, reference is made to the general section of the specification and to the claims.

Lastly, it is emphasized in particular that the above exemplary embodiments, selected completely arbitrarily, are used solely for illustrating the teaching according to the invention, which is not limited to these exemplary embodiments.

The invention claimed is:

1. Method for connecting a filter medium to a separately formed V-shaped flap or strip-shaped connection element, the filter medium and the connection element being brought into contact with one another and being connected to one another as a result of the action of laser radiation from a laser radiation source, the filter medium comprising a folded sheet-like layer of thermoplastic nonwoven including folded pleats and fold end faces, the separately formed connection element comprising a thermoplastic nonwoven, wherein at least one separately formed connection element is connected to the fold end faces of the sheet-like layer, the separately formed connection element being pressed against the filter medium and providing a contact point, wherein either one or the other of the separately formed connection element or the filter medium absorb said laser radiation and melt and flow into the thermoplastic nonwoven of the other material and said contact point has a fused region depth of 1 mm or less and does not include a compressed region or permanent deformation as between said contact point and said filter medium.

2. Method according to claim 1 wherein said connection element is of multi-layer construction comprising a layer being transparent to laser light and a further layer absorbent to laser light.

3. Method according to claim 1 wherein a laser-light absorbing layer is associated with the filter medium.

4. Method according to claim 1, wherein at least one connection element is connected to the fold pleats of the sheet-like layer.

5. Method according to claim 1, wherein defined regions of the filter medium and of the connection element which face away from the laser radiation source are fused by means of the laser radiation.

6. Method according to claim 5, characterized in that the energy of the laser radiation is transmitted to the defined regions by means of an optical device.

7. Method according to claim 6 characterized in that the optical device is brought into contact with one or both of the filter medium and the connection element.

8. Method according to claim 6, characterized in that a sphere that is transparent to laser light is used as the optical device.

9. Method according to claim 6, characterized in that at least one rotatable cylinder that is transparent to laser light is used as the optical device.

10. Method according to claim 1 wherein said connection element is of multi-layer construction comprising a layer being transparent to laser light and a further layer absorbent to laser light and wherein a laser-light absorbing layer is associated with the filter medium.

11. Filter element, comprising at least one filter medium and at least one separately formed V-shaped flap or strip-shaped connection element, the filter medium and the separately formed connection element being pressed against one another at contact points which comprise a region of fused thermoplastic generated by laser radiation, said contact point having a fused depth of 1 mm or less and not including a compressed region or permanent deformation, the filter medium being designed from a folded flat sheet as a concertina including folded pleats and fold end faces, and the filter medium and separately formed connection element comprising thermoplastic nonwovens, wherein the fold end faces are connected to the separately formed connection element, wherein one or the other of the separately formed connection element and the filter medium absorb said laser radiation and melt and flow into the thermoplastic nonwoven of the other material the connection element being of multi-layer design, at least one layer being transparent to laser light and a further layer absorbing laser light, the filter medium including a layer absorbing laser light.

12. Filter element according to claim 11, wherein the contact points extend over at most 1 millimeter in at least one spatial direction.

13. Filter element according to claim 11, wherein the contact points extend over at most one 1 millimeter into the depth of the filter medium and/or of the connection element.

14. Filter element according to claim 11, wherein the filter medium includes fold pleats and said fold pleats are connected to the connection element.

15. Filter element according to claim 11, wherein the connection element covers at least one side of the filter medium over the entire area.

16. Filter element according to claim 11, wherein the layer absorbing laser light or the region absorbing laser light includes activated charcoal.

17. Filter element according to claim 11, wherein said contact points are free of adhesive.

18. Filter element according to claim 11, wherein only at said contact points at which the filter medium and the connection element are connected are the filter medium and connection element fused or melted.

19. Filter element according to claim 11 wherein said connection element is of multi-layer construction comprising a layer being transparent to laser light and a further layer absorbent to laser light and wherein a laser-light absorbing layer is associated with the filter medium.

* * * * *